Figure 1:
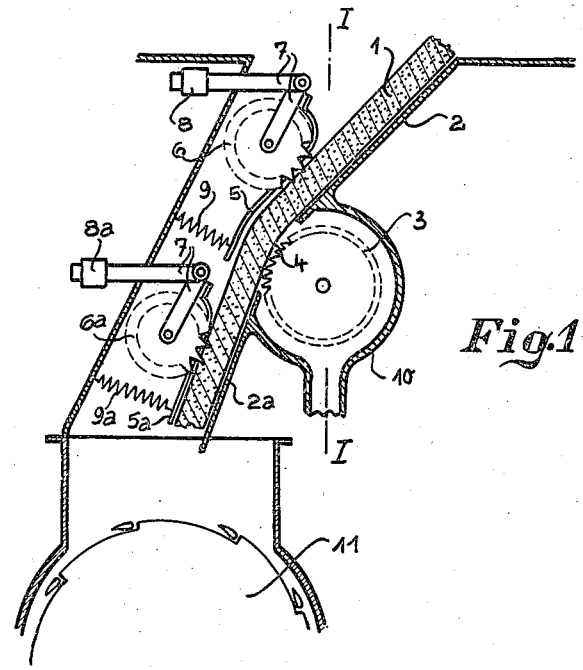

INVENTOR
PHILIPP LORENZ FAUTH, DECEASED, BY
WILHELM FAUTH, ADMINISTRATOR

BY Richards & Geier
ATTORNEYS

Patented Sept. 9, 1941

2,255,207

UNITED STATES PATENT OFFICE 2,255,207

TREATMENT OF WHALE BLUBBER, SKINS, AND THE LIKE

Philipp Lorenz Fauth, deceased, late of Wiesbaden-Dotzheim, Germany, by Wilhelm Fauth, administrator, Wiesbaden-Dotzheim, Germany, assignor to Fauth Patent A.-G., Luxemburg, Luxemburg, a corporation of Luxemburg Application April 19, 1939, Serial No. 268,700
In Germany March 3, 1938

3 Claims. (Cl. 146—130)

This invention comprises improvements in, and relating to, the treatment of whale blubber, skins, and the like, and is particularly concerned with the removal of the layer of black pigment from the skins of whales, when treating the blubber for the purpose of obtaining oil and spinnable fibres therefrom. For obtaining these products it has been proposed to convert the blubber by comminution into a pulp from which the oil, water and fibrous substances are separated by heat treatment and settlement, or by centrifuging, or by pressing or the like, or by treatment in hot water baths, substances such as salts, alcohol or the like being added to the pulp, if desired, for accelerating the separation.

The comminution, which may be carried out in a machine in accordance with the British specification of Patent No. 458,975, breaks up not only the blubber, but also the thick black pigment layer which is to be found associated with the strong cellular structure of the whale skin. As a result the fibres separated from the pulp are contaminated with the black pigment layer which depreciates their value since the pigment layer does not comprise any valuable cellular structure.

Experiments have been conducted to separate the black pigment layer from the blubber by means of a machine for removing the thick skin from long lengths or strips about 60–80 cm. wide. However, these experiments were not successful, since, owing to the natural curvature of the whale body, the lengths did not lie flat on the machine support. In addition, the blubber, interspersed with a highly dense fibrous structure, constitutes a solid mass. Thus heavy complicated machines are required for pressing lengths of blubber firmly against the support so that they bear flatly against the support over their entire width. The necessity for employing such machines renders the removal of the hard skin uneconomical. The length of the blubber, about 10–30 cm. thick, freed from the black pigment layer was passed to the comminuting machine, disposed under the machine for removing the hard skin, the pigment layer being discharged separately. Such arrangement also resulted in a complicated construction.

The separation of the black pigment layer by the machine for removing the hard skin results in relatively large quantities of blubber being removed together with the pigment layer. For recovering the fat and oil from the blubber adhering to the pigment layer, a separate comminution followed by boiling was involved, thereby rendering the process more difficult and expensive.

The treatment of whales is usually effected on floating factories capable of dealing with about 1200–1500 tons of whale daily. The space and means available are necessarily limited on such factories. Thus it is important that the methods and means employed shall be simple and reliable in operation while requiring a minimum of space and man power for operation, and the principal object of the present invention is to provide an improved process and apparatus for enabling this simplicity of operation, and economy of space and labour, to be achieved.

According to the present invention, in the treatment of whale blubber, skins and the like for cleaning a surface thereof or for removing a layer from such surface by a milling device, a strip is bent slightly towards the latter and is subjected to the milling operation at the line of bending. The strips, curved in the direction of their width, are bent so that a flat surface is presented to the milling device over the entire width of the strip. Thus, laterally arched or curved lengths of blubber, may be subjected, on their passage to the fibre-forming machine, to a slight bending towards the crest of the curve, thereby forming a flat surface on the outer surface of the blubber. The black pigment layer can be rapidly removed from the surface by a milling device rotating at high speed. Thus the pigment is removed continuously in a layer of uniform thickness from the strips of blubber as they pass the milling device. Pulp formed from the pigment layer may be pumped without further treatment directly into the boilers, whilst the blubber freed from the pigment layer is supplied to the fibre-forming machine.

Figure 2:
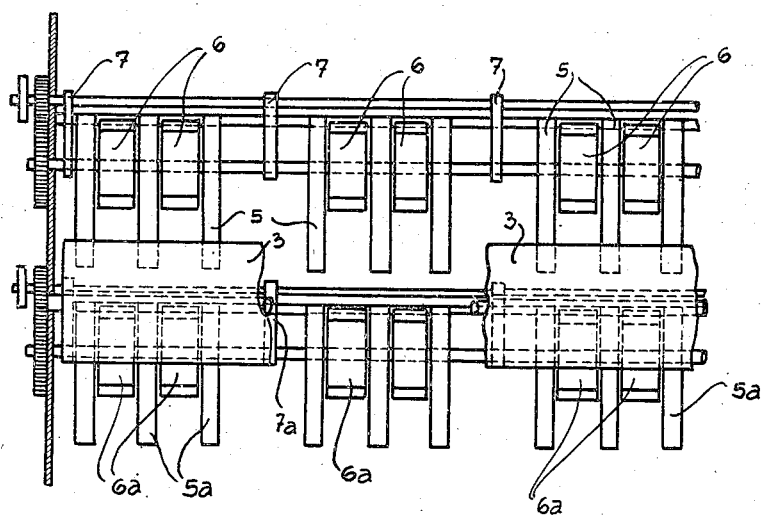

In order to enable the invention to be readily understood reference will now be made to the accompanying drawing illustrating by way of example one construction for carrying the invention into effect, in which drawing:

Figure 1 is a sectional elevation, and
Figure 2 is a section, with parts removed, on the line I—I, Figure 1.

Referring to the drawing, the blubber is supplied in the form of long strips 1, having a width of about 60–80 cm., to the milling device 3 by a slide 2. The strips are curved in the direction of their width and are bent rearwardly towards the outer convex surface, so as to provide a flat surface to be acted on by the device 3. For this purpose the lower part 2ᵃ of the slide is disposed at an obtuse angle relatively to the upper part and the milling device is enabled to act on the strip by providing a gap 4 in the slide between its upper and lower parts. Thus, as the strip passes from the upper to the lower part of the slide, the curvature of the strip is converted into an entirely flat surface opposite the milling device which extends over the entire width of the slide, for uniformly removing the layer of black pigment on the outer surface of the blubber. Preferably the milling device is movably mounted in relation to the gap 4 so that its depth of cut on the strips can be adjusted.

For the purpose of preventing the strip of blubber from being lifted from the slide 2 during the milling of the pigment layer and in order to obtain movement of the strip at a uniform speed past the milling device, a number of resilient steel blades 5 and 5ª are disposed opposite the slide 2, 2ª, and between these blades are located rotatable feed rollers 6 and 6ª, the teeth of which project slightly beyond the blades. The spring blades 5, 5ª and the toothed feed rollers 6 and 6ª are secured to rockable lever arms 7 and 7ª, so that the conveying device may be adapted to the thickness of the strip of blubber. The lever arms 7 are loaded by means of adjustable weights 8, 8ª, so that an appropriate pressure is applied to the strip of blubber. In order to increase the pressure of the steel blades, spiral springs 9, 9ª may be located behind them if necessary.

The pulp of the pigment layer which is milled from the blubber during the milling operation, is passed into the milling casing 10 from which it can then be supplied, for example by a pump, to the boilers, whilst the blubber freed from the pigment layer is supplied to the comminuting and fibre-forming device 11 for further treatment.

Instead of using the process and device above described for treating whale blubber, they may also be used for other purposes, as for example, in the leather industry for cleaning the outside of skins and the like.

Having described the invention what is claimed and desired to be secured by Letters Patent is:

1. A method of treating strips of whale blubber having a convex side carrying a layer of black pigment, said method comprising the steps of bending successively said strip in the direction of said convex side to provide flat transverse surfaces at the line of the bend, and milling each of said transverse surfaces to remove said layer of black pigment.

2. A device for treating strips of whale blubber having convex sides carrying a layer of black pigment, said device comprising a feed slide consisting of two slide portions extending at an obtuse angle, a gap being formed between said slide portions, whereby a strip of whale blubber located upon said slide portions and across said gap will be bent to follow said obtuse angle, and a milling device situated within said obtuse angle adjacent to the apex of said angle and having teeth engaging the strip portion extending over said gap on the convex side of the strip.

3. A device for treating strips of whale blubber having convex sides carrying a layer of black pigment, said device comprising a feed slide consisting of two slide portions extending at an obtuse angle, a gap being formed between said slide portions, resilient blades pressing the whale blubber strips against said slide portions, rockable lever arms carrying said resilient blades, rotary rollers situated between said resilient blades and engaging a side of the strips to feed the strips over said slide portions, whereby each strip is pressed against said slide portions to follow said obtuse angle while it is moved over said slide portions and said gap, and a milling device situated within said obtuse angle adjacent to the apex of said angle and having teeth engaging the strip portion extending over said gap on that side thereof which is opposite to the side engaged by said blades and said rollers.

WILHELM FAUTH.
*Administrator of the estate of Philipp Lorenz Fauth, deceased.*